(12) United States Patent
Yu

(10) Patent No.: US 7,540,518 B2
(45) Date of Patent: Jun. 2, 2009

(54) SEAT TUBE FOR A BICYCLE

(75) Inventor: Kuo-Pin Yu, Taichung (TW)

(73) Assignee: Yuan Min An Enterprise Co., Ltd., Taichung (TW)

( * ) Notice: Subject to any disclaimer, the term of this patent is extended or adjusted under 35 U.S.C. 154(b) by 223 days.

(21) Appl. No.: 11/497,250

(22) Filed: Aug. 2, 2006

(65) Prior Publication Data

US 2007/0284846 A1    Dec. 13, 2007

(30) Foreign Application Priority Data

Jun. 9, 2006    (TW) ............................... 95210174 U

(51) Int. Cl.
*B62K 7/00* (2006.01)
(52) U.S. Cl. .................. 280/281.1; 280/274; 280/283
(58) Field of Classification Search ................ 280/274, 280/281.1, 283
See application file for complete search history.

(56) References Cited

U.S. PATENT DOCUMENTS

| | | | | |
|---|---|---|---|---|
| 3,380,259 A | * | 4/1968 | Rubenstein | 405/155 |
| 3,592,994 A | * | 7/1971 | Ford | 219/89 |
| 3,638,455 A | * | 2/1972 | Francois | 464/181 |
| 3,730,564 A | * | 5/1973 | Bachle et al. | 285/115 |
| 3,943,225 A | * | 3/1976 | Koehn | 264/255 |
| 3,993,331 A | * | 11/1976 | Schwarz | 285/53 |
| 4,155,590 A | | 5/1979 | Cunningham | |
| 4,167,953 A | * | 9/1979 | Carlstrom | 138/133 |
| 5,395,108 A | * | 3/1995 | Souders et al. | 473/567 |
| 5,979,978 A | | 11/1999 | Olsen et al. | |
| 6,213,488 B1 | * | 4/2001 | Filice et al. | 280/281.1 |
| 6,237,506 B1 | * | 5/2001 | Forbes | 105/355 |
| 6,327,994 B1 | * | 12/2001 | Labrador | 114/382 |
| 7,232,388 B2 | * | 6/2007 | Sutherland et al. | 473/567 |
| 7,390,005 B2 | * | 6/2008 | Lin | 280/274 |
| 7,403,686 B1 | * | 7/2008 | Zervas | 385/100 |
| 7,410,433 B2 | * | 8/2008 | Guenther et al. | 473/567 |
| 7,413,207 B2 | * | 8/2008 | Yu | 280/279 |
| 7,413,522 B2 | * | 8/2008 | O'Neill et al. | 473/481 |
| 7,419,222 B2 | * | 9/2008 | Schmitz et al. | 297/440.2 |

(Continued)

FOREIGN PATENT DOCUMENTS

EP    1864893 A2 *    12/2007

OTHER PUBLICATIONS

European Search Report dated Aug. 6, 2008.

*Primary Examiner*—Paul N Dickson
*Assistant Examiner*—Patrick Centolanzi
(74) *Attorney, Agent, or Firm*—Browdy and Neimark, P.L.L.C.

(57) ABSTRACT

A seat tube for a bicycle includes an upright tube, a head and an inner tube all of which are made of fiber reinforced material. The upright tube has an inserting portion at a top thereof. The head has an inside chamber and a sleeve portion at a bottom thereof. The sleeve portion of the head is sleeved onto the inserting portion of the upright tube such that the inside chamber of the head is communicated with an inside of the upright tube. An outer wall of the inserting portion of the upright tube is a taper face converging upward. The inner tube is disposed at a junction of the upright tube and the head and interconnected with the upright tube and the head. Thus, the seat tube has strong structure with light weight.

5 Claims, 5 Drawing Sheets

U.S. PATENT DOCUMENTS

| | | | |
|---|---|---|---|
| 7,422,224 B2 * | 9/2008 | Sicz et al. | 280/274 |
| 7,431,317 B2 * | 10/2008 | Wu | 280/281.1 |
| 7,441,836 B2 * | 10/2008 | Chen et al. | 297/202 |
| 7,454,106 B2 * | 11/2008 | Cobb et al. | 385/100 |
| 7,465,108 B2 * | 12/2008 | Brown | 396/427 |
| 2002/0149241 A1 | 10/2002 | Morgan, Jr. | |
| 2007/0281794 A1 * | 12/2007 | Thurber et al. | 473/44 |

* cited by examiner

SEAT TUBE FOR A BICYCLE

BACKGROUND OF THE INVENTION

1. Field of the Invention

The present invention relates to a bicycle and more particularly to such a seat tube having strong structure with light weight.

2. Description of the Related Art

A conventional seat tube for a bicycle is made of metal. Recently, the bicycle is developed towards reducing its weight and adopts fiber reinforced material. As shown in FIG. 1, the seat tube 1 is made of carbon fiber reinforced resin. The seat tube 1 has an upright tube 4 and a head 5 which are manufactured by winding multiple layers of pre-pregs into an elongated tube having a closed end and an open end, placing the elongated tube into a die, inflating the elongated tube through the open end to make the elongated tube abut on an inner wall of the die, and curing the elongated tube.

The inner wall of the seat tube 1 bears the air pressure during curing such that the shape of the inner wall is often irregular and the thickness of the inner wall is uneven, as shown in FIGS. 2-3. Therefore, the structure strength of the seat tube 1 is uneven and the structure failure is often generated at the weakness of the structure due to stress concentration. Besides, the outer wall of the seat tube 1 is restricted by the die, which has an inevitably manufacturing error, so that the shape of the outer wall of the upright tube 4 can not achieve a true circle. The upright tube 4 needs to be further trimmed to make the outer wall approach a true circle for conforming to the product standards. The trimming destroys the texture of the fibers and reduces the structure strength of the upright tube 4. If the quantity of the pre-pregs used in the seat tube 1 is increase for enhancing the structure strength, the weight of the product is unintentionally increased. There is always a problem as how to reduce the weight of the seat tube and increase the structure strength at the same time.

SUMMARY OF THE INVENTION

The primary objective of the present invention is to provide a seat tube for a bicycle, which has high structure strength and light weight.

The other objective of the present invention is to provide a seat tube for a bicycle, which has an upright tube having a wall with even thickness.

The foregoing objectives of the present invention are attained by the seat tube includes an upright tube, a head and an inner tube which are all made of fiber reinforced material. The upright tube has an inserting portion at a top thereof. The head has an inside chamber and a sleeve portion at a bottom thereof. The sleeve portion of the head is sleeved onto the inserting portion of the upright tube such that the inside chamber of the head is communicated with an inside of the upright tube. An outer wall of the inserting portion of the upright tube is a taper face converging upward for inserting into the sleeve portion of the head. The inner tube is disposed at a junction of the upright tube and the head and interconnected with the upright tube and the head. Thus, the seat tube has strong structure with light weight.

DETAILED DESCRIPTION OF THE INVENTION

Figure 1:
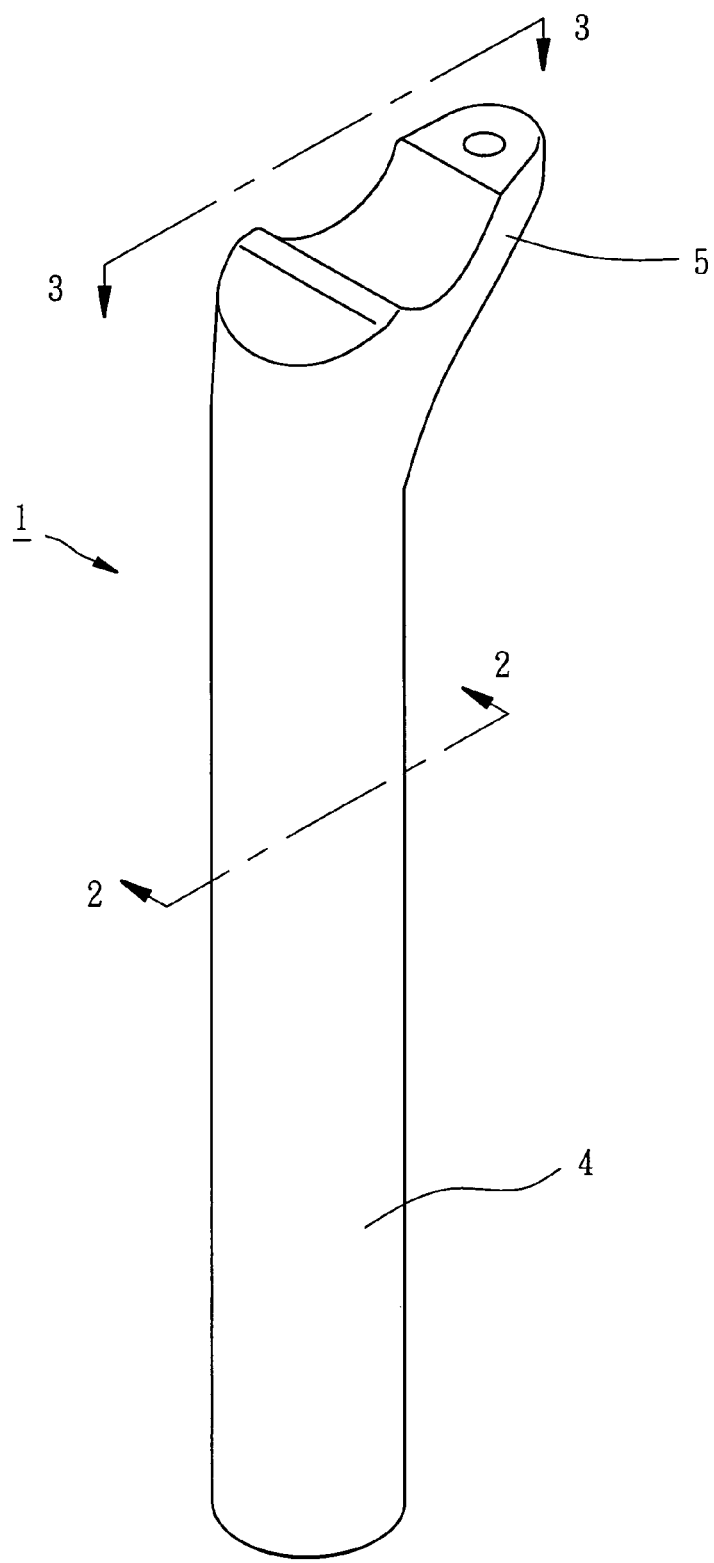
FIG. 1 is a perspective view of a conventional seat tube.
Figures 2, 3:
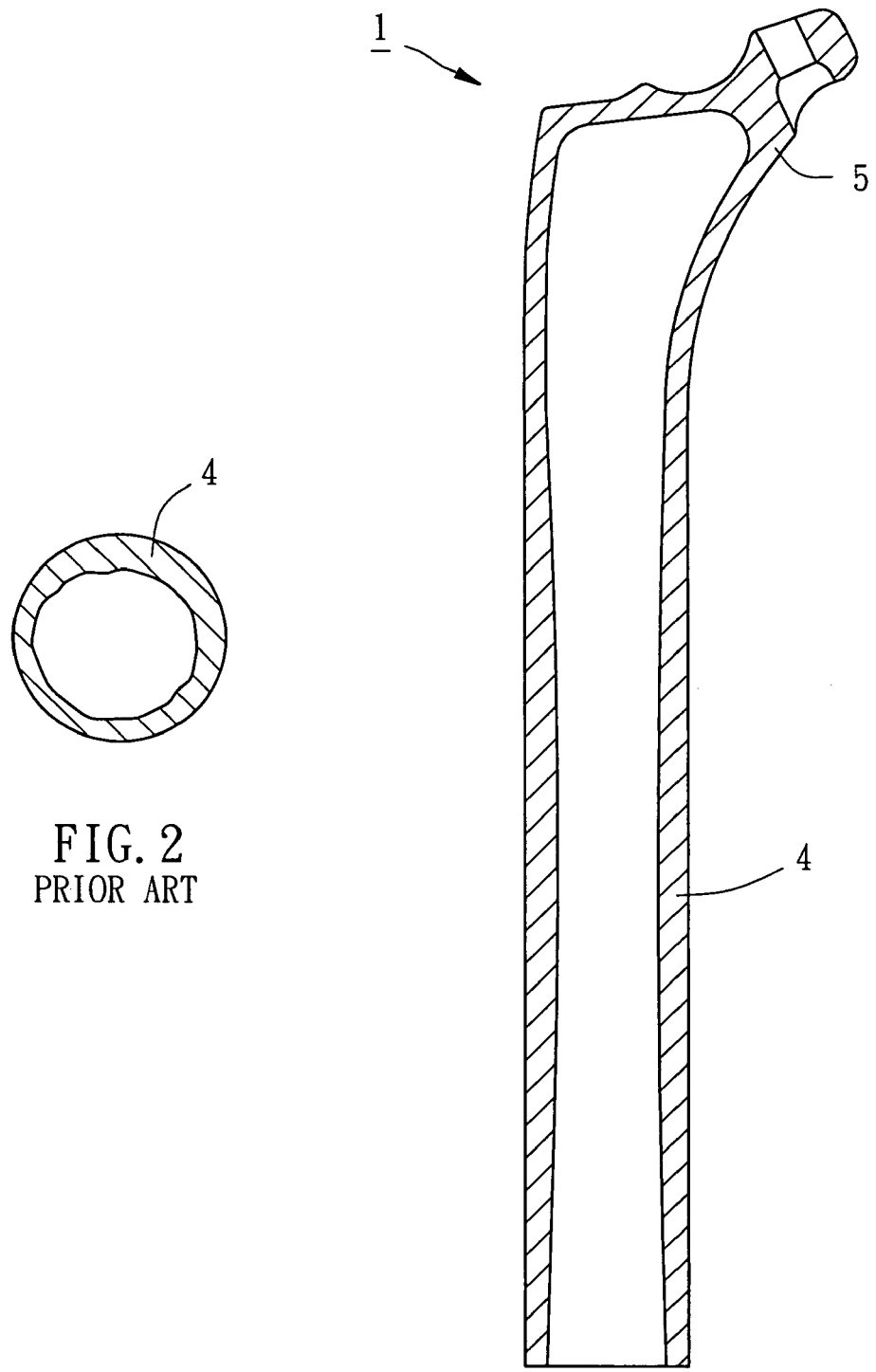
FIG. 2 is a sectional view along the 2-2 line in FIG. 1.
FIG. 3 is a sectional view along the 3-3 line in FIG. 1.
Figure 4:
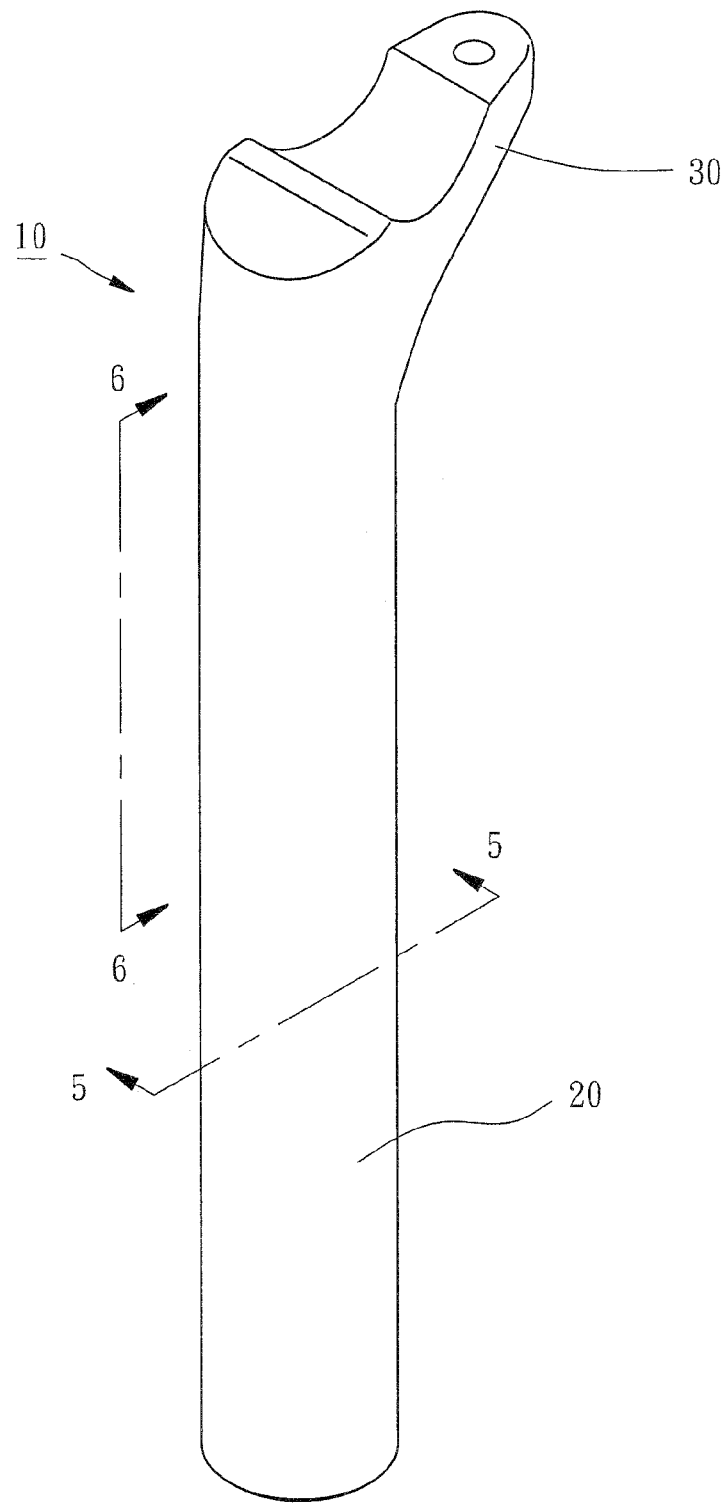
FIG. 4 is a perspective view of a first preferred embodiment of the present invention.
Figures 5, 6:
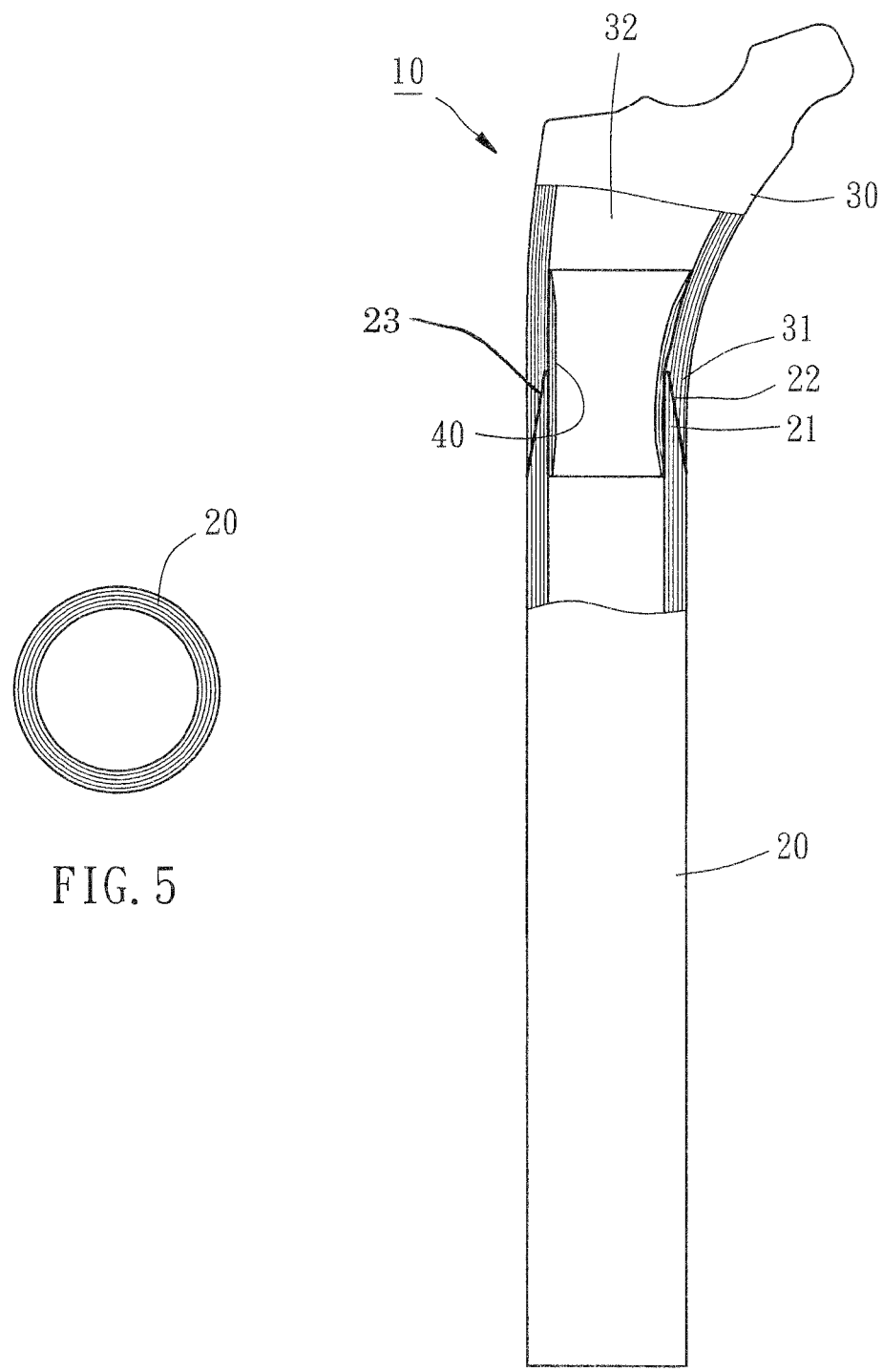
FIG. 5 is a sectional view along the 5-5 line in FIG. 4.
FIG. 6 is a sectional view along the 6-6 line in FIG. 4.

Referring to FIGS. 4-6, a seat tube 10 for a bicycle in accordance with the first embodiment of the present invention is shown comprised an upright tube 20, a head 30 and an inner tube 40.

The upright tube 20 is made of fiber reinforced resin material. The fiber can be but is not restricted to carbon fiber, glass fiber, boron fiber or KEVLAR® fiber. The resin can adopt thermosetting resin or thermoplastic resin. The upright tube 20 is manufactured by winding multiple layers of pre-pregs onto a mandrel (not shown) and curing the pre-pregs. The inner wall of the upright tube 20 is restricted by the mandrel, which is a cylinder, so that the cross section of the inner wall is substantially a true circle as shown in FIG. 5. The wall thickness of the upright tube 20 is uniform and the cross section of an outer wall of the upright tube 20 is substantially a true circle since the pre-pregs are wound onto the mandrel layer by layer, as shown in FIGS. 5-6. Perhaps the outer wall of the upright tube 20 needs to be trimmed very slightly to conform to product standards, but the trimming will not harm the fiber texture. The upright tube 20 has an inserting portion 21 at a top thereof. The outer wall of the inserting portion 21 of the upright tube 20 is a taper face 22 converging upward. The taper face 22 is formed right after the pre-pregs are wound or by trimming after the pre-pregs are cured.

The head 30 is made of fiber reinforced resin material. The head 30 is manufactured by winding multiple layers of pre-pregs into an embryo having a bottom which has a second taper face 23 converging downward and outward toward an outer wall corresponding with and engaging the first taper face 22 permitting the head 30 is sleeved onto the inserting portion 21 of the upright tube 20. Thus, the bottom forms a sleeve portion 31 joining the head 30 and the upright tube 20 together. The inner tube 40 is formed by winding multiple layers of pre-pregs at the junction of the head 30 and the upright tube 20 to join the head 30 and the upright tube 20 more firmly. The head 30 has an inside chamber 32 communicating with an inside of the upright tube 20. Then, place the head 30 and the top of the upright tube 20 into a die (not shown), inflate the head 30 through the bottom of the upright tube 20 to make the head 30 abut on an inner wall of the die, and cure the head 30 and the inner tube 40 to join the head 30 and the upright tube 20 together. The outer periphery of the head 30 is substantially in line with the outer periphery of the upright tube 20.

Since the cross sections of the inner wall and the outer wall of the upright tube 20 are substantially true circles and the wall thickness of the upright tube 20 is uniform, the effect of the stress concentration in the prior art can be avoided. Therefore the structure strength of the seat tube 10 can be improved. Furthermore, under the premise that the structure strength of the seat tube 10 is enough, the quantity of the pre-pregs used in the seat tube 10 can be reduced such that the weight of the seat tube 10 can be decreased to achieve the foresaid objectives of the present invention.

Figure 7:
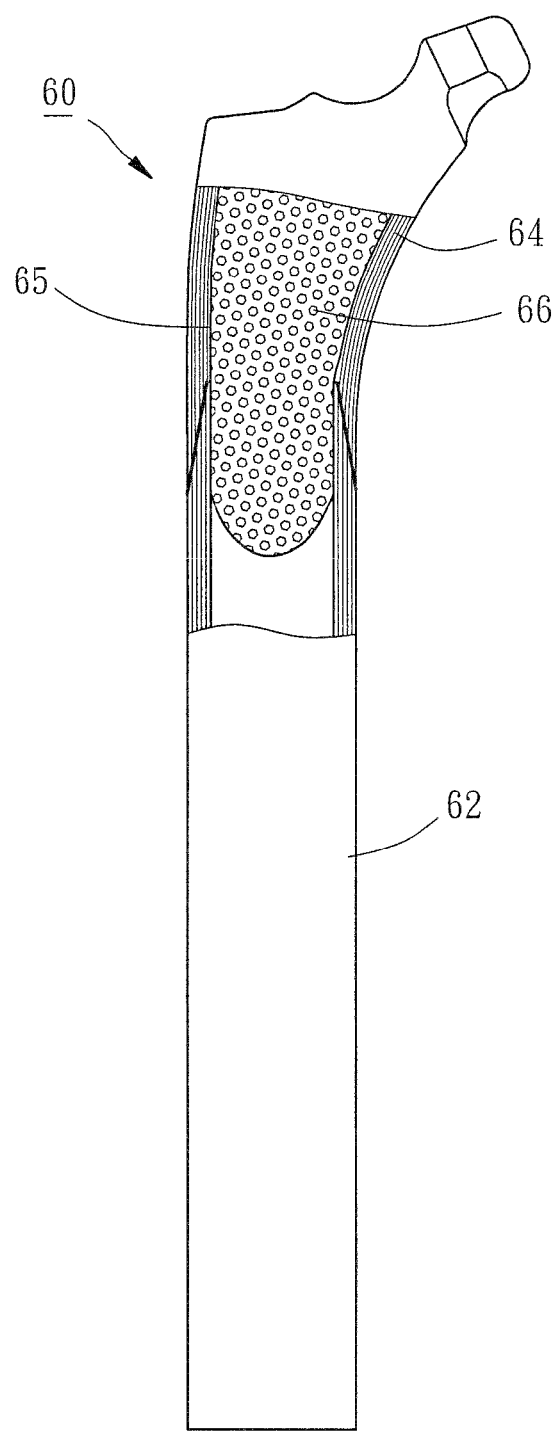
FIG. 7 is a sectional view of a second preferred embodiment of the present invention.

The structure of the seat tube has alternatives without departing from the spirit of the present invention. For example, as shown in FIG. 7, a seat tube 60 for a bicycle in accordance with the second embodiment of the present invention is shown comprised an upright tube 62, a head 64 mounted on a top of the upright tube 62, and a foamed core 66 filled in an inside chamber 65 of the head 64. When the head 64 is cured in a die (not shown), there is no need to inflating the head 64 since foamed core 66 will expand to make the head 64 abut on the inner wall of the die.

In practice, either the foamed core or high pressure air can be used to make the head abut on the inner wall of the die. The quantity of the foamed core can be reduced when high pressure air is used cooperatively. The shape of the head can be altered according to the structure of the chair. Although particular embodiments of the invention have been described in detail for purposes of illustration, various modifications and enhancements may be made without departing from the spirit and scope of the invention.

What is claimed is:

1. A seat tube for a bicycle, comprising:
   an upright tube made of fiber reinforced material and having an inserting portion at a top thereof;
   a head made of fiber reinforced material and having an inside chamber and a sleeve portion at a bottom thereof;
   wherein the sleeve portion overlaps and is fixed to the inserting portion of the upright tube so that the inside chamber of the head communicates with an inside of the upright tube;
   wherein an inner tube is fixed over a junction formed by and inside of the overlapping upright tube and the head;
   wherein an outer wall of the inserting portion of the upright tube is a first taper face converging upward and inward toward an inner wall of the inserting portion; and
   wherein an inner wall of the sleeve portion of the head is a second taper face converging downward and outward toward an outer wall of the head and corresponding with the first taper face.

2. The seat tube for a bicycle as claimed in claim 1, further comprising a foamed core filled in the chamber of the head.

3. The seat tube for a bicycle as claimed in claim 1, wherein a cross section of an inner wall of the upright tube is substantially a true circle.

4. The seat tube for a bicycle as claimed in claim 1, wherein a cross section of an outer wall of the upright tube is substantially a true circle.

5. The seat tube for a bicycle as claimed in claim 1, wherein the fiber reinforced material of both the upright tube and the head is multiple layers of wound pre-pegs.

\* \* \* \* \*